UNITED STATES PATENT OFFICE.

THOMAS A. HUGUENIN, OF CHARLESTON, SOUTH CAROLINA.

COMPOSITION FOR CURING PAVING BLOCKS OR BRICKS.

SPECIFICATION forming part of Letters Patent No. 313,823, dated March 10, 1885.

Application filed November 28, 1884. (No specimens.)

*To all whom it may concern:*

Be it known that I, THOMAS A. HUGUENIN, a citizen of the United States of America, residing in the city of Charleston, in the county of Charleston and State of South Carolina, have invented new and useful Improvements in Paving Blocks or Bricks, of which the following is a specification.

My invention has relation to improvements for curing bricks or blocks molded and shaped of common clay and baked, the object being to make the brick or formed block of common burnt or baked clay a suitable and durable article for paving streets, roadways, and avenues of travel.

My invention consists, first, in a novel composition of matter in which and by the effects of which the brick or block is prepared; and, second, my invention consists in an improved brick prepared according to the process hereinafter stated.

My improved composition of matter is composed of the following-named ingredients in about the proportions stated, and prepared in the following-described manner: I take of coal-tar, sixty gallons; of bitumen, twenty-five pounds; of pine-gum, thirty pounds, and of alum, two pounds. These several ingredients are put into a large pan or other suitable vessel, and then heated gradually and until they become thoroughly mixed and in a liquid condition. The mixture is then ready to have the bricks or blocks put in and subjected to its influences and effects.

To more speedily and fully impart to the bricks the qualities resulting from treatment in the composition, I thoroughly dry them by any convenient means, in which treatment I heat them to about 300° Fahrenheit. This expels all moisture, and leaves them more porous, so that the mixture shall be taken up or absorbed by them. After the bricks have been thus heated I immerse them in the liquid composition, and let them remain therein from two to six hours, according to the quality and size of the bricks. Bricks of compact composition take more time to fully absorb the complement of mixture, and large bricks of course take more time for preparation than small ones.

The effects of the several ingredients may be stated as follows: The coal-tar permeates the body of the bricks and serves as a cement. The pine-gum, being of a turpentine nature, tends to harden and dry up the lighter oils of the coal-tar, and the gummy substance keeps the bricks from becoming slippery. The bitumen gives elasticity and strength, and acts as a preventive of disintegration, and the alum keeps the mixture from concreting and from burning during the process. The qualities attributed to the ingredients separately are retained by the mixture, and are imparted to the bricks when immersed in the mixture and subjected to its action by immersion.

I am aware that bricks, &c., have heretofore been preserved by being plunged into highly-heated hydrocarbons or hydrocarbons mingled with sulphur and then left to cool; but I am not aware that a defined formula of hydrocarbons in composition and a non-combustible ingredient in conflict with my invention, has ever before been used.

What I claim as my invention, and desire to secure by Letters Patent, is—

1. The herein-described compound, consisting of coal-tar, bitumen, pine-gum, and alum, combined in substantially the manner and proportions and for the purpose stated.

2. A brick or block cured by immersion in a mixture of coal-tar, bitumen, pine-gum, and alum, substantially as described.

In witness whereof I have hereunto signed my name in the presence of two attesting witnesses.

THOMAS A. HUGUENIN.

Attest:
 EDWARD F. MILAN,
 THOMAS W. HUGHES.